United States Patent
Takamizu

(10) Patent No.: US 10,259,937 B2
(45) Date of Patent: Apr. 16, 2019

(54) RESIN-MODIFYING PARTICLES AND VINYL CHLORIDE RESIN COMPOSITION CONTAINING SAME

(71) Applicant: KANEKA CORPORATION, Osaka-shi (JP)

(72) Inventor: Kenji Takamizu, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 100 days.

(21) Appl. No.: 15/520,337

(22) PCT Filed: Oct. 29, 2015

(86) PCT No.: PCT/JP2015/080561
§ 371 (c)(1),
(2) Date: Apr. 19, 2017

(87) PCT Pub. No.: WO2016/068239
PCT Pub. Date: May 6, 2016

(65) Prior Publication Data
US 2017/0335097 A1    Nov. 23, 2017

(30) Foreign Application Priority Data

Oct. 29, 2014    (JP) .................................. 2014-220426

(51) Int. Cl.
| | | |
|---|---|---|
| *C08L 27/06* | (2006.01) | |
| *C08L 51/00* | (2006.01) | |
| *C08L 51/04* | (2006.01) | |
| *C08L 33/06* | (2006.01) | |
| *C08L 63/00* | (2006.01) | |
| *C08L 101/00* | (2006.01) | |
| *C08F 220/32* | (2006.01) | |

(52) U.S. Cl.
CPC .............. *C08L 51/003* (2013.01); *C08L 27/06* (2013.01); *C08L 33/068* (2013.01); *C08L 51/04* (2013.01); *C08L 63/00* (2013.01); *C08L 101/00* (2013.01); *C08F 220/32* (2013.01); *C08L 2201/08* (2013.01); *C08L 2205/03* (2013.01); *C08L 2205/06* (2013.01); *C08L 2207/53* (2013.01)

(58) Field of Classification Search
CPC .... C08L 51/04; C08L 51/003; C08L 2207/53; C08L 2220/325
See application file for complete search history.

(56) References Cited

U.S. PATENT DOCUMENTS

| | | | |
|---|---|---|---|
| 2012/0271004 A1 | 10/2012 | Quinebeche et al. | |
| 2012/0316293 A1 | 12/2012 | Bouilloux et al. | |
| 2013/0131272 A1 | 5/2013 | Quinebeche et al. | |
| 2013/0209784 A1* | 8/2013 | Nakagawa .............. | C08L 77/00 428/314.8 |
| 2015/0005107 A1* | 1/2015 | Sullivan ............. | A63B 37/0031 473/376 |
| 2015/0203682 A1* | 7/2015 | Bhatia ..................... | C08L 77/06 524/186 |
| 2017/0362395 A1* | 12/2017 | Inoubli ...................... | C08J 3/22 |

FOREIGN PATENT DOCUMENTS

| | | |
|---|---|---|
| JP | 63-118320 A | 5/1988 |
| JP | 6-80842 A | 3/1994 |
| JP | 2005-314440 A | 11/2005 |
| JP | 2008-63424 A | 3/2008 |
| JP | 5037910 B2 | 10/2012 |
| JP | 2012-533642 A | 12/2012 |

OTHER PUBLICATIONS

Matsumoto et al., electronic translation of JP 63-118320, May 1998.*
International Search Report dated Nov. 24, 2015 in PCT/JP2015/080561 Filed Oct. 29, 2015.
Extended European Search Report dated Apr. 10, 2018 in European Patent Application No. 15855313.1, 10 pages.

* cited by examiner

*Primary Examiner* — Jeffrey C Mullis
(74) *Attorney, Agent, or Firm* — Oblon, McClelland, Maier & Neustadt, L.L.P.

(57) ABSTRACT

The present invention relates to resin-modifying particles, each of which contains a glycidyl group-containing polymer (B) and a core-shell copolymer (C) at a composite state, and a vinyl chloride resin composition containing a vinyl chloride resin (A) and the resin-modifying particles, and the like.

20 Claims, No Drawings

RESIN-MODIFYING PARTICLES AND VINYL CHLORIDE RESIN COMPOSITION CONTAINING SAME

TECHNICAL FIELD

The present invention relates to resin-modifying particles useful for the improvement of a resin in the viewpoint of the impact resistance, the heat stability, and the appearance, a vinyl chloride resin composition containing the resin-modifying particles, a method for preparing resin-modifying particles, a method for preparing a vinyl chloride resin composition, and a molded product.

BACKGROUND ART

In the molding process of a vinyl chloride resin, there may be some problems that mechanical properties are decreased and the coloration is generated due to a decomposition of a resin according to processing conditions such as a long residue time and a molding at high temperature. Therefore, a metal stabilizer such as lead, barium-zinc, calcium-zinc, tin and the like, and an epoxy stabilizer such as an epoxidized soybean oil are generally used as a stabilizer.

Patent document 1 discloses a vinyl chloride resin composition containing a glycidyl group-containing polymer as an epoxy stabilizer and a core-shell copolymer as an impact modifier.

However, the glycidyl group-containing polymer is a rigid resin in the powder form, and is hardly dispersed in the vinyl chloride resin in the powder state, so that there is a problem that granulated projections on the surface of a resin are generated from insufficient dispersibility in some cases.

PRIOR ART

Patent Document

Patent Document 1: JP5037910

SUMMARY OF THE INVENTION

Problem to be Solved by the Invention

The present inventors have confirmed that many granulated projections are generated on the surface of the resin in patent document 1. Thus, in a vinyl chloride resin composition containing a conventional stabilizer, there are problems that the granulated projections are generated on the surface of a resin due to insufficient dispersibility of the stabilizer and the appearance is deteriorated, even if the impact resistance and the heat stability are satisfied.

Thus, the object of the present invention is to provide resin-modifying particles having excellent impact resistance and heat stability, and providing the appearance having decreased granulated projections on the surface of the resin, a vinyl chloride resin composition, a method for preparing resin-modifying particles, a method for preparing a vinyl chloride resin composition, and a molded product.

Means for Solving the Problems

The present inventors have found that when each of a glycidyl group-containing copolymer and a core-shell copolymer are mixed in a state of latex, and latexes are coagulated to obtain resin-modifying particles, the resin-modifying particles have excellent impact resistance and heat stability, and are useful for decreasing granulated projections on the surface of a resin, to complete the present invention.

In addition, the present inventors have found that both an acid coagulating agent and a salt coagulating agent are preferably useful for the preparation of resin-modifying particles having desirable properties, and an acid coagulating agent is more preferably useful for the preparation of the resin-modifying particles having desirable properties such as decrease of granulated projections on the surface of a resin.

The gist of the present invention is as follows:

[1] Resin-modifying particles, each of which comprises a glycidyl group-containing polymer (B) and a core-shell copolymer (C) at a composite state.

[2] The resin-modifying particles according to [1], wherein the glycidyl group-containing polymer (B) comprises a polymer obtained by polymerizing 50 to 100% by weight of a glycidyl group-containing ethylenically unsaturated monomer (B1) and 0 to 50% by weight of an unsaturated monomer (B2) different from the glycidyl group-containing ethylenically unsaturated monomer (B1).

[3] The resin-modifying particles according to [1] or [2], wherein the core-shell copolymer (C) comprises a core layer having an elastic rubber and a shell layer having a vinyl polymer covering the core layer.

[4] The resin-modifying particles according to any one of [1] to [3], wherein the glycidyl group-containing polymer (B) is contained in an amount of 1 to 30 parts by weight per 100 parts by weight of the sum of the glycidyl group-containing polymer (B) and the core-shell copolymer (C).

[5] The resin-modifying particles according to any one of [1] to [4], wherein a total amount of Mg and Ca is 100 ppm or less.

[6] A vinyl chloride resin composition comprising a vinyl chloride resin (A) and the resin-modifying particles as defined in any one of [1] to [5].

[7] The vinyl chloride resin composition according to [6], wherein the resin-modifying particles are contained in an amount of 1 to 30 parts by weight per 100 parts by weight of the vinyl chloride resin (A).

[8] The vinyl chloride resin composition according to [6] or [7], further comprising 0.1 to 3.0 parts by weight of a tin stabilizer.

[9] A method for preparing resin-modifying particles, comprising mixing a latex of a glycidyl group-containing polymer (B) with a latex of a core-shell copolymer (C), and coagulating a mixture of the glycidyl group-containing polymer (B) and the core-shell copolymer (C) by either acid coagulation or salt coagulation.

[10] The method according to [9], wherein the mixture of the glycidyl group-containing polymer (B) and the core-shell copolymer (C) are coagulated by acid coagulation.

[11] The method according to [9] or [10], wherein 0.1 to 10 parts by weight of the glycidyl group-containing polymer (B) is mixed with 0.1 to 20 parts by weight of the core-shell copolymer (C).

[12] A method for preparing a vinyl chloride resin composition, comprising adding 1 to 30 parts by weight of the resin-modifying particles obtained by the method as defined in any one of [9] to [11] to 100 parts by weight of a vinyl chloride resin (A).

[13] A molded product obtained by molding the vinyl chloride resin composition as defined in any one of [6] to [8], wherein the number of granulated projections having a size of from 10 μm to 1000 μm on the surface of the molded product is 600 or less per 20 cm×20 cm.

Effect of the Invention

According to the present invention, the molded product having excellent balance among the impact resistance, the heat stability, and the appearance can be provided.

MODE FOR CARRYING OUT THE INVENTION

1. Resin-Modifying Particles

Resin-modifying particles of the present invention contain a glycidyl group-containing polymer (B) and a core-shell copolymer (C) at a composite state in each of the particles. As set forth below, the resin-modifying particles are obtained by mixing a latex of a glycidyl group-containing polymer with a latex of a core-shell copolymer, and coagulating latexes in a state that the glycidyl group-containing polymer and the core-shell copolymer are compounded each other. The glycidyl group-containing polymer and the core-shell copolymer are uniformly mixed in each of particles having a latex particles size such as submicron size, and this is referred to as "composite state" in the specification.

1-1. Glycidyl Group-Containing Polymer (B)

The glycidyl group-containing polymer (B) of the present invention preferably contains a polymer obtained by polymerizing 50 to 100% by weight of a glycidyl group-containing ethylenically unsaturated monomer (B1) and 0 to 50% by weight of an unsaturated monomer (B2) different from the glycidyl group-containing ethylenically unsaturated monomer (B1).

In a weight ratio of the glycidyl group-containing ethylenically unsaturated monomer (B1) and the unsaturated monomer (B2) different from the glycidyl group-containing ethylenically unsaturated monomer (B1), an amount of the glycidyl group-containing ethylenically unsaturated monomer (B1) is preferably 50 to 100% by weight, more preferably 60 to 100% by weight, even preferably 70 to 100% by weight, and particularly preferably 80 to 100% by weight per 100% by weight of each of particles in the viewpoint of the heat stability. In the case where the amount of the glycidyl group-containing ethylenically unsaturated monomer (B1) is less than 50% by weight, the heat stability becomes insufficient in some cases.

The glycidyl group-containing ethylenically unsaturated monomer (B1) may have a structure including an epoxy group in a molecule. The glycidyl group-containing ethylenically unsaturated monomer (B1) includes glycidyl methacrylate, glycidyl acrylate, 3,4-epoxycyclohexyl methacrylate, 3,4-epoxycyclohexyl acrylate and the like. These monomers can be used individually or in the combination of two or more monomers. The glycidyl group-containing ethylenically unsaturated monomer (B1) is preferably glycidyl methacrylate in the viewpoint of high glass transition temperature and powder property. In the present invention, (meth)acrylate means acrylate and/or methacrylate.

In addition, the unsaturated monomer (B2) different from the glycidyl group-containing ethylenically unsaturated monomer (B1) includes a (meth)acrylate containing an alkyl group of carbon atoms 1 to 20 such as methyl (meth)acrylate, ethyl (meth)acrylate, n-propyl (meth)acrylate, i-propyl (meth)acrylate, n-butyl (meth)acrylate, iso-butyl (meth)acrylate, sec-butyl (meth)acrylate, tert-butyl (meth)acrylate, n-amyl (meth)acrylate, iso-amyl (meth)acrylate, n-hexyl (meth)acrylate, 2-ethylhexyl (meth)acrylate, n-octyl (meth)acrylate, nonyl (meth)acrylate, decyl (meth)acrylate, dodecyl (meth)acrylate, lauryl (meth)acrylate, stearyl (meth)acrylate; a (meth)acrylate containing an aralkyl group of carbon atoms 7 to 20 such as benzyl (meth)acrylate; a (meth)acrylate containing a cycloalkyl group of carbon atoms 3 to 20 such as cyclohexyl (meth)acrylate, p-tert-butylcyclohexyl (meth)acrylate; a (meth)acrylate containing a hydroxyl group such as 2-hydroxyethyl (meth)acrylate, 2-(3-)hydroxyl propyl (meth)acrylate, 4-hydroxybutyl (meth)acrylate, glycerol (meth)acrylate; a (meth)acrylate containing an amino group such as amide (meth)acrylate, N,N-dimethylaminoethyl (meth)acrylate; an unsaturated monomer containing a heterocyclic group such as vinylpyridine, vinylimidazole, vinylpyrrolidone; an unsaturated monomer containing a halogen such as vinyl chloride, vinylidene chloride, vinyl fluoride, vinylidene fluoride, tetrafluoroethylene, hexafluoropropylene; an unsaturated monomer containing an aromatic group such as styrene, α-methylstyrene, vinyl toluene, p-chlorostyrene; vinyl acetate; vinyl ether; (meth)acrylonitrile; an unsaturated monomer containing a monocarboxylic acid group such as (meth)acrylic acid, crotonic acid; an unsaturated monomer containing a dicarboxylic acid group such as itaconic acid, monomethyl itaconic acid, monoethyl itaconic acid, monopropyl itaconic acid, monobutyl itaconic acid, dimethyl itaconic acid, diethyl itaconic acid, dipropyl itaconic acid, dibutyl itaconic acid, monobutyl itaconic acid, fumaric acid, monomethyl fumaric acid, monoethyl fumaric acid, monopropyl fumaric acid, monobutyl fumaric acid, dimethyl fumaric acid, diethyl fumaric acid, dipropyl fumaric acid, dibutyl fumaric acid, maleic acid, monomethyl maleic acid, monoethyl maleic acid, monopropyl maleic acid, monobutyl maleic acid, dimethyl maleic acid, diethyl maleic acid, dipropyl maleic acid, dibutyl maleic acid; an unsaturated monomer containing a sulfonic acid group such as vinyl sulfonate, styrene sulfonate, and a sulfoethyl (meth)acrylate; an ethylenically unsaturated monomer containing a phosphate such as 2-(meth)acryloyloxyethyl acid phosphate, 2-(meth)acryloyloxypropyl acid phosphate, 2-(meth)acryloyloxy-3-chloropropyl acid phosphate, 2-methacryloyloxyethylphenyl phosphate, and the like. The unsaturated monomer (B2) can be used individually or in the combination of two or more monomers.

Among these, the unsaturated monomer (B2) preferably contains a (meth)acrylate containing an alkyl group and an unsaturated monomer containing an aromatic group, more preferably methyl (meth)acrylate, ethyl (meth)acrylate, n-propyl (meth)acrylate, styrene, α-methyl styrene, and even preferably methyl (meth)acrylate and styrene.

In the case where the unsaturated monomer (B2) is (meth)acrylate containing an alkyl group, an amount of (meth)acrylate containing an alkyl group is preferably 40 to 100% by weight, more preferably 50 to 98% by weight, and even preferably 60 to 95% by weight per 100% by weight of the unsaturated monomer (B2).

In the case where the unsaturated monomer (B2) is an unsaturated monomer containing an aromatic group, an amount of the unsaturated monomer containing an aromatic group is preferably 0 to 60° by weight, more preferably 2 to 50% by weight, and even preferably 5 to 40% by weight per 100% by weight of the unsaturated monomer (B2).

The glycidyl group-containing polymer (B) of the present invention has a weight average molecular weight (Mw) of preferably 10,000 to 500,000, more preferably 10,000 to 250,000, even preferably 10,000 to 200,000, even more preferably 10,000 to 150,000, and particularly preferably 20,000 or more, or 70,000 or more in the viewpoint of the dispersibility of the particles.

The weight average molecular weight can be measured by using, for example, gel permeation chromatography (manufactured by Tosoh Corporation, HLC-8220GPC).

The glycidyl group-containing polymer (B) of the present invention has a volume average particle diameter of preferably 0.05 to 0.5 µm, more preferably 0.1 to 0.3 µm, even preferably 0.1 to 0.2 µm, and particularly preferably 0.15 to 0.18 µm in the viewpoint of the heat stability.

When the glycidyl group-containing polymer of the present invention is polymerized, an initiator and/or a chain transfer agent can be used to control a weight average molecular weight (Mw). The chain transfer agent includes known chain transfer agents such as mercaptans such as n-dodecyl mercaptan, t-dodecyl mercaptan, n-octylmercaptan, n-tetradecylmercaptan, n-hexylmercaptan, n-butylmercaptan; halogenated compounds such as carbon tetrachloride, ethylene bromide; α-methylstyrene dimer, and the like. The amount of the chain transfer agent may be changed according to kinds of chain transfer agents to be used and compositions of the unsaturated monomers. The chain transfer agent can be used individually or in the combination of two or more chain transfer agents.

A method for polymerizing the glycidyl group-containing polymer (B) of the present invention is preferably a method using medium such as water, for example, emulsion-polymerization, suspension-polymerization and the like, in the viewpoint of the easiness of the recovery, the decreased odor, handling, and blocking resistance, and the economy of the glycidyl group-containing polymer (B). The method for polymerizing the glycidyl group-containing polymer (B) is most preferably emulsion-polymerization in the viewpoint of the dispersibility of the particles into the vinyl chloride resin. In addition, in the case where the glycidyl group-containing polymer is polymerized with a method for polymerizing a structure like particle such as emulsion-polymerization, soap free emulsion polymerization, dropping suspension-polymerization and the like, the structure of the glycidyl group-containing polymer may be a monolayer or a multilayer. In the case of the glycidyl group-containing polymer containing the multilayer, the glycidyl group-containing polymer preferably has the structure of not more than three layers.

The emulsifier for emulsion-polymerizing the glycidyl group-containing polymer (B) of the present invention includes anionic emulsifiers, cationic emulsifiers, nonionic emulsifiers and the like. The anionic emulsifiers such as fatty acid salts, alkyl sulfate ester salts, alkylbenzene sulfonate salts, alkyl phosphate ester salts, sulfosuccinic acid diester salts; cationic emulsifiers such as alkyl amine salts; nonionic emulsifiers such as polyoxyethylenealkylethers, polyoxyethylene fatty acid esters can be used. These emulsifiers can be used individually or in the combination of two or more emulsifiers.

A solvent used in the solution polymerization of the glycidyl group-containing polymer (B) of the present invention includes a known organic solvent such as an aromatic solvent such as toluene, xylene and the like; an ester solvent such as ethyl acetate, butyl acetate, cellosolve acetate; a ketone solvent such as acetone, methyl ethyl ketone, diethyl ketone, methylisobutyl ketone and the like. These solvents may be used alone or in combination of two or more solvents. In addition, the dispersion stabilizer used in the suspension-polymerization of the glycidyl group-containing polymer (B) of the present invention includes a water-soluble polymer such as gelatin, starch, polyvinylalcohol, carboxymethyl cellulose, insoluble powder such as calcium carbonate, magnesium carbonate, and the like. These dispersion stabilizers may be used individually or in the combination of two or more stabilizers.

1-2. Core-Shell Copolymer (C)

The core-shell copolymer (C) of the present invention preferably contains a core layer having an elastic rubber, and a shell layer having a vinyl polymer covering the core layer. In the core-shell polymer, the shell layer is graft-bonded to the core layer. A part or the whole of the core, layer may be covered with the shell layer graft-polymerized.

It is more preferably that the core layer is at least one rubber selected from the group consisting of diene rubber, acrylic rubber, and silicone rubber as at least one core layer (C1).

The core layer may be multilayer, and a composition of each of the core layers may be the same or different.

The core layer preferably contains a polymer obtained by polymerizing 50 to 100% by weight of diene monomer (C1-1) and 0 to 50% by weight of a monomer (C1-2) copolymerizable with the diene monomer (C1-1).

The diene monomer (C1-1) is preferably butadiene, isoprene, chloroprene and the like, and more preferably butadiene.

The monomer (C1-2) copolymerizable with the diene monomer (C1-1) is preferably an aromatic vinyl monomer such as styrene, α-methylstyrene, vinylnaphtalene and the like, a vinyl cyanide monomer such as (meth)acrylonitrile and the like.

Each of the diene monomer and the monomer copolymerizable with the diene monomer may be used individually or in two or more monomers.

The core layer may be polymerized using a multifunctional monomer in order to increase the degree of the crosslink. The multifunctional monomer is preferably divinylbenzene, triallyl(iso)cyanurate, allyl (meth)acrylate, diallyl itaconic acid, diallyl phthalate and the like.

The diene rubber includes polybutadiene, styrene-butadiene rubber (SBR), acrylonitrile-butadiene rubber (NPR), ethylene-propylene-diene terpolymer rubber (EPDM), and the like. Among these, polybutadiene is preferred.

The core layer preferably contains a polymer obtained by polymerizing 50 to 100% by weight of (meth)acrylate monomer (C1-3) and 0 to 50% by weight of a monomer (C1-4) copolymerizable with the (meth)acrylate monomer.

The (meth)acrylate monomer (C1-3) is preferably an alkyl group-containing (meth)acrylate such as methyl (meth)acrylate, ethyl (meth)acrylate, butyl (meth)acrylate, 2-ethylhexyl (meth)acrylate, octyl (meth)acrylate, dodecyl (meth)acrylate; a hydroxyl alkyl (meth)acrylate such as 2-hydroxyethyl (meth)acrylate, 4-hydroxybutyl (meth)acrylate, and the like.

The monomer (C1-4) copolymerizable with the (meth) acrylate monomer may be the same as the monomer (C1-2) copolymerizing with the diene monomer.

Each of the (meth)acrylate monomer (C1-3) and the monomer (C1-4) copolymerizable with the (meth)acrylate monomer may be used individually or in the combination of two or more monomers.

The core layer includes a silicone rubber such as a polysiloxane rubber containing alkyl- or aryl-2-substituted silyloxy units such as dimethyl silyloxy, diethyl silyloxy, methylphenyl silyloxy, diphenyl silyloxy, dimethyl silyloxy-diphenyl silyloxy, or a polysiloxane rubber containing alkyl- or aryl-1-substituted silyloxy units such as a polysiloxane rubber having an organohydrogen silyloxy in which a part of alkyl in the side chain is substituted with hydrogen.

The core layer may be a combined rubber containing the acrylic rubber and the silicone rubber, and is preferably a combined rubber containing dimethylsiloxane/butylacrylate.

As the shell layer (C2) having at least one layer, the shell layer preferably contains a copolymer obtained by polymerizing 50 to 100% by weight, more preferably 60 to 95% by weight, even preferably 65 to 90% by weight of a vinyl monomer (C2-1) selected from the group consisting of methacrylic acid ester and acrylic acid ester, and 0 to 50% by weight, more preferably 5 to 40% by weight, and even preferably 10 to 35% by weight of a monomer (C2-2) copolymerizable with the vinyl monomer (C2-1).

The vinyl monomer (C2-1) preferably includes a (meth)acrylate monomer such as an alkyl (meth)acrylate such as methyl methacrylate, ethyl methacrylate, n-butyl methacrylate, t-butyl methacrylate, lauryl methacrylate, methyl acrylate, ethyl acrylate, n-butyl acrylate, 2-ethylhexyl acrylate, cyclohexyl acrylate; a hydroxyl alkyl (meth)acrylate such as 2-hydroxyethyl methacrylate, 2-hydroxyethyl acrylate, 4-hydroxybutyl methacrylate, 4-hydroxybutyl acrylate; a glycidyl (meth)acrylate such as glycidyl methacrylate, glycidyl acrylate; an aralkyl (meth)acrylate such as benzyl acrylate, benzyl methacrylate.

The monomer (C2-2) copolymerizable with the vinyl monomer (C2-1) is preferably a (meth)acrylonitrile such as acrylonitrile, methacrylonitrile, an aromatic vinyl monomer such as styrene, α-methylstyrene, a halogenated vinyl monomer such as vinyl chloride, vinyl bromide, vinyl fluoride, and the like.

These monomers are used individually or in the mixture of two or more monomers. Particularly, an alkyl (meth)acrylate, an aromatic vinyl monomer are preferable, and the combination of methyl methacrylate, styrene, n-butyl acrylate is more preferable in the viewpoint of the dispersibility of the particles into the vinyl chloride resin and the powderization of the particles.

The shell layer may be formed by adding each of monomers for forming the shell layer to a aqueous latex containing a core polymer prepared by emulsion polymerization, and polymerizing the monomers with the core polymer.

As a component ratio of the core-shell copolymer (C) of the present invention, the core-shell copolymer has, for example, 40 to 99.9% by weight of the core layer (C1) and 0.1 to 60% by weight of the shell layer (C2), preferably 50 to 99.9% by weight of the core layer (C1) and 0.1 to 50% by weight of the shell layer (C2), and more preferably 60 to 99.9% by weight of the core layer (C1) and 0.1 to 40% by weight of the shell layer (C2) in the viewpoint of the balance between the impact resistance and the compatibility into the resin.

In the case where the amount of the core layer is less than 40% by weight, the impact resistance is not exhibited sufficiently in some cases. On the other hand, in the case where the amount of the core layer is more than 99.9% by weight, the handling is deteriorated due to too high viscosity of the composition.

An amount of the glycidyl group-containing polymer (B) is preferably 1 to 30 parts by weight, more preferably 2 to 25 parts by weight, and even preferably 5 to 20 parts by weight per 100% by weight of the sum of the glycidyl group-containing polymer (B) and the core-shell copolymer (C). In the case of less than 1 part by weight, the heat resistance and the mechanical properties are lowered in some cases, and in the case of more than 30 parts by weight, granulated projections on the surface of the molded product are increased in some cases. The amount of the glycidyl group-containing polymer may be a solid content in the case of mixing a latex of the glycidyl group-containing polymer and a latex of the core-shell copolymer.

An amount of alkaline earth metals, preferably a total amount of Mg and Ca is preferably 100 ppm or less, more preferably 50 ppm or less, even preferably 10 ppm or less, and particularly preferably 0 ppm in the resin-modifying particles. When the large amount of Mg and Ca is added to the resin, the heat resistance, the aging resistance, and the moldability become insufficient in some cases.

A method for preparing resin-modifying particles contains steps of mixing a latex of a glycidyl group-containing polymer (B) and a latex of a core-shell copolymer (C), and coagulating a mixture of the glycidyl group-containing polymer (B) and the core-shell copolymer (C) by either acid coagulation or salt coagulation.

That is, in the case where the mixture of the glycidyl group-containing polymer (B) and the core-shell copolymer (C) is coagulated to prepare powder of the particles, it is preferable that a latex of a glycidyl group-containing polymer (B) and a latex of a core-shell copolymer (C) are mixed, the resultant latexes are subjected to salt coagulation or acid coagulation, or are contacted with a coagulating agent such as an inorganic salt or an acid, to prepare powder of a polymer mixture including the glycidyl group-containing polymer (B) and the core-shell copolymer (C). The obtained polymer mixture including the glycidyl group-containing polymer (B) and the core-shell copolymer (C) prevents the generation of granulated projections on the surface of the resin due to insufficient dispersibility of the glycidyl group-containing polymer, compared to the case where powder obtained by coagulating the glycidyl group-containing polymer (B) is mixed with powder obtained by coagulating the core-shell copolymer (C).

It is preferable that the resin-modifying particles are prepared by mixing a latex of a glycidyl group-containing polymer (B) and a latex of a core-shell copolymer (C), and coagulating a mixture of the glycidyl group-containing polymer (B) and the core-shell polymer (C) by acid coagulation.

A mixture of latexes may be prepared by mixing 0.1 to 10 parts by weight, preferably 0.1 to 5 parts by weight, more preferably 0.1 to 1 part by weight of the glycidyl group-containing polymer (B) and 0.1 to 20 parts by weight, preferably 0.5 to 20 parts by weight, more preferably 1 to 15 parts by weight of the core-shell copolymer (C).

In the case where a latex of a polymer mixture including the glycidyl group-containing polymer (B) and the core-shell copolymer (C) is powdered, an acid coagulating agent includes an inorganic acid such as hydrochloric acid, sulfuric acid, nitric acid, phosphoric acid and the like; an organic acid such as formic acid, acetic acid, propionic acid, maleic acid and the like. These acid coagulating agents can be used individually or in the combination of two or more acid coagulating agents. Among these, hydrochloric acid, sulfuric acid, phosphoric acid, and acetic acid are preferred, and hydrochloric acid is more preferred. The acid coagulating agent has a merit that granulated projections on the surface of the molded product are decreased compared with that of a salt coagulating agent as set forth below.

In the case where a latex of a polymer mixture including the glycidyl group-containing polymer (B) and the core-shell copolymer (C) is powdered, a salt coagulating agent includes an inorganic salt such as sodium chloride, calcium chloride, magnesium chloride, sodium sulfate, calcium sulfate, magnesium sulfate and the like; an organic salt such as calcium acetate, magnesium acetate and the like. These salt coagulating agents can be used individually or in the combination of two or more salt coagulating agents.

Among these, calcium chloride and magnesium chloride are preferred.

The coagulating agent may be added to a mixture of latexes in the form of solid, and may be added to a mixture of latexes in the form of a solution containing the coagulating agent. It is preferable that a solution containing the coagulating agent is used in the viewpoint of the workability.

In the case of adding the coagulating agent to the mixture of latexes, an amount of the coagulating agent is, for example, 0.0001 to 0.01 parts by weight, preferably 0.001 to 0.01 parts by weight per 100 parts by weight of the mixture of latexes.

When the solution containing the coagulating agent is added to the mixture of latexes, the solution containing the coagulating agent has a concentration of, for example, 0.1 to 10% by weight, and preferably 0.2 to 5% by weight.

A temperature at the time where a mixture of latexes is coagulated is, for example, 5 to 50° C., preferably 15 to 40° C. The mixing of the mixture of latexes with the coagulating agent or a solution containing the coagulating agent is preferably carried out under stirring.

The coagulated latex mixture is subjected to a heat treatment, a dehydrating treatment, a washing treatment, and a drying treatment and the like, to prepare resin-modifying particles.

In powder of the polymer mixture (resin-modifying particles) of the glycidyl group-containing polymer (B) and the core-shell copolymer (C), an amount of the glycidyl group-containing polymer (B) is, for example, 30% by weight or less, preferably 20% by weight or less, more preferably 15% by weight or less per 100% by weight of each of resin-modifying particles. In the case where the amount of the glycidyl group-containing polymer (B) is much large, there are the processing problems that the impact resistance is lowered and melt viscoelasticity is increased in the molded product obtained from the vinyl chloride resin composition.

In addition, it is preferable that an amount of the core-shell copolymer (C) is, for example, 70% by weight or more, preferably 80% by weight or more, and more preferably 85% by weight or more per 100° by weight of each of resin-modifying particles.

Further, an amount of the glycidyl group-containing polymer (B) is, for example, 0.5% by weight or more, preferably 5.0% by weight or more, while an amount of the core-shell polymer (C) is, for example, 99.5% by weight or less, and preferably 95.0% by weight or less. When the amount of the glycidyl group-containing polymer (B) is much small, the sufficient heat stability is not expressed for the vinyl chloride resin composition.

Each of the resin-modifying particles has, for example, a volume average particle diameter of, for example, 0.001 to 10 μm, preferably 0.002 to 5 μm, and more preferably 0.005 to 1 μm.

The volume average particle diameter can be measured using a particle size analyzer (manufactured by NIKKISO Co Ltd., Nanotracwave).

2. Vinyl Chloride Resin Composition

In one embodiment, the present invention encompasses a vinyl chloride resin composition containing a vinyl chloride resin (A) and a polymer mixture (resin-modifying particles) obtained by mixing a latex of a glycidyl group-containing polymer (B) with a latex of a core-shell copolymer (C), and coagulating a mixture of the glycidyl group-containing polymer (B) and the core-shell copolymer (C) by either acid coagulation or salt coagulation.

Thus, the vinyl chloride resin composition contains a vinyl chloride resin and resin-modifying particles as a polymer mixture.

The vinyl chloride resin (A) of the present invention may have a structure in which one or more hydrogens of monomer units used in polyolefin and polydiene are substituted with at least one chloride. The vinyl chloride resin includes polyvinyl chloride, chlorinated polyvinyl chloride, polyvinylidene chloride, chlorinated polyethylene, vinyl chloride-vinyl acetate copolymer, vinyl chloride-ethylene copolymer, and chloroprene rubber. The vinyl chloride resin is preferably polyvinyl chloride and chlorinated polyvinyl chloride.

The vinyl chloride resin has an average polymerization degree of, for example, from 300 to 4000, and preferably from 600 to 1500.

In the vinyl chloride resin composition, an amount of the polymer mixture (resin-modifying particles) containing the glycidyl group-containing polymer (B) and the core-shell copolymer (C) is preferably 1 to 30 parts by weight, more preferably 2 to 20 parts by weight, and particularly preferably 3 to 15 parts by weight, per 100 parts by weight of the vinyl chloride resin (A), in the viewpoint of the heat distortion resistance of the molded product and the like.

If necessary, stabilizers, lubricants, plasticizers, coloring agents, fillers, foaming agents may be added to the vinyl chloride resin composition of the present invention.

A stabilizer includes an organic tin stabilizer such as methyl tin mercapto, butyl tin mercapto, octyl tin mercapto, dibutyl tin maleate, dibutyl tin maleate polymer, dioctyl tin maleate, dioctyl tin maleate polymer, dibutyl tin dilaurate, dibutyl tin dilaurate polymer; a lead stabilizer such as stearic acid lead, bibasic phosphite lead, tribasic sulfuric acid lead; a calcium-zinc stabilizer; a barium-zinc stabilizer; a cadmium-barium stabilizer and the like. These may be used individually or in two or more stabilizers.

An amount of the stabilizer (preferably tin stabilizer) is preferably 0.1 to 3.0 parts by weight, more preferably 0.2 to 3.0 parts by weight, even preferably 0.5 to 2.5 parts by weight per 100 parts by weight of the vinyl chloride resin.

One or more plasticizers selected from the following plasticizers can be used: a phthalate plasticizer such as di-2-ethylhexyl phthalate (DOP), di-n-octyl phthalate, diisononyl phthalate (DINP), dibutyl phthalate (DBP) and the like; a phosphate plasticizer such as tricresyl phosphate (TCP), trixylyl phosphate (TXP), triphenyl phosphate (TPP), tri-2-triethylhexyl phosphate (TOTM) and the like; a fatty acid ester plasticizer such as 2,2,4-trimethyl-1,3-pentanedioldiisobutylate (TXIB), di-2-ethylhexyladipate (DEHA), di-2-ethylhexylsebacate and the like; a polyacrylic plasticizer such as polybutylacrylate, n-butylacrylate/methylmethacrylate copolymer, 2-ethylhexyl acrylate/methylmethacrylate copolymer, 2-ethylhexyl acrylate/methylmethacrylate/n-butyl methacrylate copolymer and the like.

The filler includes calcium carbonate, magnesium carbonate, lithium carbonate, caolinclay, plaster, maica, talc, magnesium hydroxide, calcium silicate, borax, titanium oxide, and the like.

A method for molding the vinyl chloride resin composition into various molded product is not limited particularly, and includes a conventional method for processing the vinyl chloride resin such as extrusion molding, injection molding, calendaring molding, press molding, and the like.

The molded product of the present invention is a molded product from the vinyl chloride resin composition, and the number of granulated projections having a size of from 10 μm to 1000 μm on the surface of the molded product is 600 or less per 20 cm×20 cm.

Granulated projections mean those capable of visually observing on the surface of the molded product and having a size of from 10 µm to 1000 µm. The number of the granulated projections is preferably 580 or less, more preferably 560 or less, even preferably 540 or less, and even more preferably 520 or less per 20 cm×20 cm.

In the molded product of the present invention by using as a resin a vinyl chloride resin, izod impact value at 23° C. measured according to JIS K 7110 is, for example, 85 kJ/m$^2$ or more, preferably 90 kJ/m$^2$ or more, more preferably 95 kJ/m$^2$, and even preferably 100 kJ/m$^2$ or more.

The molded product of the present invention is used for applications such as secondary molding sheet, flooring, ink, paint, heat sealing agent for aluminium film, metal coating agent, pipe and fitting for hot water, industrial pipe and fitting, pipe and fitting for sprinkler, underground pipe for accommodating power cable, film, sheet, filter, machines, adhesive agent and the like.

The present application claims the benefit of priority to Japanese Patent Application Number 2014-220426 filed on Oct. 29, 2014. The entire contents of the specification of Japanese Patent Application Number 2014-220426 filed on Oct. 29, 2014 are hereby incorporated by reference.

EXAMPLES

Hereinafter, the present invention will be described in detail with reference to Examples, but the present invention is not limited thereto, and the variation and the modification of the present invention without departing the gist described above and below are all included the technical scope of the present invention. In the following Examples and Comparative Examples, "part(s)" and "%" mean "part(s) by weight" and "% by weight", respectively.

<Measurement of Weight Average Molecular Weight>

A sample to be measured was dissolved in tetrahydrofuran (THF), and a soluble content was measured by gel permeation chromatography (manufactured by TOSOH CORPORATION, HCL-8220 GPC), to prepare a weight average molecular weight of the glycidyl group-containing polymer (B). Conditions for measurement were sample solution of sample 20 mg/THF 10 mL, measurement temperature of 25° C., refractive index detector, and injected amount of 1 mL.

<Measurement of Volume Average Particle Diameter>

A volume average particle diameter of resin-modifying particles was measured using particle size analyzer (manufactured by NIKKISO Co Ltd., Nanotracwave) at a wavelength of 546 nm as scattering light. The volume average particle diameters of the particles as a polymer were 0.01 to 0.5 µm.

<Impact Resistance>

To 100 parts of a vinyl chloride resin (A1) (manufactured by KANEKA CORPORATION, product name: Kanevinyl (registered trademark) S-1008, average polymerization degree of 800), 1.0 part of methyl tin mercapto stabilizer (manufactured by KATSUTA KAKO CO., LTD, product name: TM-181FSJ), 1.0 part of processing aid (manufactured by KANEKA CORPORATION, product name: Kaneace (registered trademark) PA-20), 0.5 parts of internal lubricant (manufactured by Emery Oleochemicals, product name: GH4), 0.4 parts of external lubricant (manufactured by Emery Oleochemicals, product name: G70S), 10 parts of a powdered polymer mixture (resin-modifying particles) of the glycidyl group-containing polymer (B) and the core-shell copolymer (C) were mixed in the form of powder. A resultant mixture was kneaded using 8 inch test roll (manufactured by KANSAI ROLL Co., Ltd., test roll) under conditions of a rotation speed of 17 rpm, a temperature of 165° C., and kneading time of five minutes, a kneaded mixture was pressed and molded with a press machine at 180° C. for 15 minutes, to prepare a pressed plate having a thickness of 1.0 mm. A test piece for izod impact test of No. 2 A having a thickness of 5.0 mm, a length of 70 mm, and a width of 15 mm was prepared from the pressed plate. The impact resistance was measured at 0° C. and 23° C. using the test piece according to JIS K 7110.

<Heat Stability (Blackening Time)>

A test piece having a thickness of 1.0 mm, a length of 10 mm and a width of 10 mm was prepared by roll-kneading, press-molding under the same compositions and conditions as the above impact resistance evaluation. The test piece was subjected to heat stability test using a constant temperature drying equipment (manufactured by SATAKE CHEMICAL EQUIPMENT MFG., LTD, hot air circulation and constant temperature drying equipment) according to JIS K 7212 under conditions of a temperature of 180° C., a testing time of 110 minutes, and a hanging manner. Every 10 minutes after the start of test, the test piece was taken from the constant temperature drying equipment, and a time when L value of color tone became 20 or less was considered to be blackening, to evaluate a blackening time as the heat stability.

<Un-Gelled Materials (Un-Gelled Parts)>

In the samples used in the evaluation of the above heat stability, the number of un-gelled parts (granulated projections) on the sheet of 20 cm×20 cm area was visually observed to count the number of the un-gelled parts. The un-gelled parts (granulated projections) had a size of 10 µm to 1000 µm on the surface of the molded product.

Production Example of Glycidyl Group-Containing Polymer (B-1) (Production Example 1-1)

To a reactor equipped with a stirrer, 0.8 parts of sodium dioctyl succinic acid dissolved in water, 0.0005 parts of ferrous sulfate ($FeSO_4.7H_2O$), 0.002 parts of disodium ethylenediamine tetra acetic acid, 0.5 parts of sodium carbonate, and 0.055 parts of sodium formaldehyde sulfoxylate were added, and water was added thereto so that a total amount of water was adjusted to 200 parts. The inside of the reactor was substituted with nitrogen, and oxygen contained in the space of the reactor and water was removed, and a mixture was heated to 60° C. with stirring. A mixture containing 85 parts of glycidyl methacrylate, 10 parts of methylmethacrylate, 5 parts of styrene, 0.5 parts of t-dodecylmercaptan and 0.03 parts of t-butylhydroperoxide was continuously added thereto to carry out a polymerization. After the termination of the addition of copolymerizable monomers, a temperature of the mixture was maintained at 60° C. while stirring for 1 hour or more. After the termination of the polymerization, the mixture was cooled to prepare a latex of the glycidyl group-containing polymer (B-1).

Production Examples 1-2 to 1-6

Glycidyl group-containing polymers (B-2 to B-6) were prepared by emulsion-polymerizing components shown in Table 1 in the same manner as Production Example 1-1.

Abbreviations described in Table 1 mean the following terms.
GMA: glycidyl methacrylate
MMA: methyl methacrylate
St: styrene
tDM: t-dodecylmercaptan

TABLE 1

Production Example of latex of glycidyl group-containing polymer (B)

| | | | Production Example 1-1 B-1 | Production Example 1-2 B-2 | Production Example 1-3 B-3 | Production Example 1-4 B-4 | Production Example 1-5 B-5 | Production Example 1-6 B-6 |
|---|---|---|---|---|---|---|---|---|
| Composition of glycidyl group-containing polymer (B) | GMA | % by weight | 85 | 100 | 50 | 85 | 85 | 20 |
| | MMA | % by weight | 10 | | 45 | 10 | 10 | 75 |
| | St | % by weight | 5 | | 5 | 5 | 5 | 5 |
| | tDM | % by weight | 0.5 | 0.5 | 0.5 | | 2.5 | 0.5 |
| Physical property of glycidyl group-containing polymer (B) | weight average molecular weight | Mw | 122,000 | 106,000 | 150,000 | 203,000 | 17,500 | unavailable polymerization |
| | volume average particle diameter | μm | 0.152 | 0.202 | 0.197 | 0.188 | 0.188 | |

From results of Table 1, a latex of the glycidyl group-containing polymer (b) having a weight average molecular weight of 17,500 to 203,000 and a volume average particle diameter of 0.152 to 0.202 μm was obtained. On the other hand, Production Example 1-6 showed that the hydrophilicity of the monomer mixture was increased, and the polymerization was impossible due to the instability of polymerization.

Production Example of Core-Shell Copolymer (C-1) (Production Example 2-1)

A pressure resistant polymerization reactor was charged with 200 parts of water, 2.2 parts of sodium oleate, 0.002 parts of ferrous sulfate ($FeSO_4 \cdot 7H_2O$), 0.007 parts of disodium ethylenediaminetetraacetate, 0.08 parts of sodium formaldehyde sulfoxylate, 0.4 parts of tripotassium phosphate, 100 parts of butadiene, 0.1 parts of p-menthane hydroperoxide, and these were polymerized to prepare a latex of diene rubber polymer. To 195 parts of the resultant latex (70 parts of solid content) were added 20 parts of water, 0.003 parts of ferrous sulfate, 0.012 parts of disodium ethylenediaminetetraacetate, and 1.7 parts of sodium formaldehyde sulfoxylate. Further, a mixture of 4.5 parts of styrene, 21 parts of methylmethacrylate, 4.5 parts of n-butyl acrylate, and 0.1 parts of t-butylhydroperoxide was continuously added thereto at 60° C. These were graft-polymerized to prepare a latex of a core-shell copolymer (C-1).

Abbreviations described in Table 2 mean the following terms.
Bd: butadiene
MMA: methyl methacrylate
St: styrene
BA: n-butyl acrylate

TABLE 2

Production Example of latex of core-shell copolymer (C)

| | | | Production Example 2-1 C-1 |
|---|---|---|---|
| Composition of core layer (c1) | Bd | % by weight | 70 |
| Composition of shell layer (c2) | MMA | % by weight | 21 |
| | St | % by weight | 4.5 |
| | BA | % by weight | 4.5 |

TABLE 2-continued

Production Example of latex of core-shell copolymer (C)

| | | | Production Example 2-1 C-1 |
|---|---|---|---|
| Physical property of core-shell copolymer (C) | volume average particle diameter | μm | 0.182 |

From results of Table 2, a latex of a core-shell copolymer (C) having a volume average particle diameter of 0.182 μm was obtained.

Production Example of Polymer Mixture (Resin-Modifying Particles) (X1) of Glycidyl Group-Containing Polymer (B-1) and Core-Shell Copolymer (C-1) (Production Example 3-1)

30 parts of a latex of the glycidyl group-containing polymer (B-1) (10 parts of solid content) was mixed with 257 parts of a latex of the core-shell copolymer (C-1) (90 parts of solid content). A weight ratio of the glycidyl group-containing polymer (B-1) and the core-shell copolymer (C-1) was 10/90. To latexes of the polymer mixture was added 1 part of hydrochloric acid diluted in 1% under temperature conditions at 25° C. to carry out a coagulation. Then, the mixture was subjected to the heat treatment, the dehydration treatment, the washing treatment, and the drying treatment to prepare a polymer mixture (resin-modifying particles) (X1).

Production Example 3-2

A latex of the glycidyl group-containing polymer (B-1) and a latex of the core-shell copolymer (C-1) were mixed in a weight ratio as shown in Table 3, to prepare a polymer mixture containing the glycidyl group-containing polymer (B-1) and the core-shell copolymer (C-1) in a state of latex. To latexes of the polymer mixture was added 1 part of phosphoric acid diluted in 1% under temperature conditions at 25° C. to carry out a coagulation. Then, the mixture was subjected to the heat treatment, the dehydration treatment, the washing treatment, and the drying treatment to prepare a polymer mixture (resin-modifying particles) (X2).

Production Example 3-3

A latex of the glycidyl group-containing polymer (B-1) and a latex of the core-shell copolymer (C-1) were mixed in a weight ratio as shown in Table 3, to prepare a polymer mixture containing the glycidyl group-containing polymer (B-1) and the core-shell polymer (C-1) in a state of latex. To latexes of the polymer mixture was added 1 part of acetic acid diluted in 1% under temperature conditions at 25° C. to carry out a coagulation. Then, the mixture was subjected to the heat treatment, the dehydration treatment, the washing treatment, and the drying treatment to prepare a polymer mixture (resin-modifying particles) (X3).

Production Example 3-4

A latex of the glycidyl group-containing polymer (B-1) and a latex of the core-shell copolymer (C-1) were mixed in a weight ratio as shown in Table 3, to prepare a polymer mixture containing the glycidyl group-containing polymer (B-1) and the core-shell polymer (C-1) in a state of latex. To latexes of the polymer mixture was added 1 part of sulfuric acid diluted in 1% under temperature conditions at 25° C. to carry out a coagulation. Then, the mixture was subjected to the heat treatment, the dehydration treatment, the washing treatment, and the drying treatment to prepare a polymer mixture (resin-modifying particles) (X4).

Production Example 3-5

A latex of the glycidyl group-containing polymer (B-1) and a latex of the core-shell copolymer (C-1) were mixed in a weight ratio as shown in Table 3, to prepare a polymer mixture containing the glycidyl group-containing polymer (B-1) and the core-shell copolymer (C-1) in a state of latex. To latexes of the polymer mixture was added 4 parts of calcium chloride diluted in 1% under temperature conditions at 25° C. to carry out a coagulation. Then, the mixture was subjected to the heat treatment, the dehydration treatment, the washing treatment, and the drying treatment to prepare a polymer mixture (resin-modifying particles) (X5).

Production Example 3-6

A latex of the glycidyl group-containing polymer (B-1) and a latex of the core-shell copolymer (C-1) were weighed in a weight ratio as shown in Table 3, to prepare coagulated products obtained by coagulating the glycidyl group-containing polymer (B-1) with calcium chloride and coagulated products obtained by coagulating the core-shell copolymer (C-1) with hydrochloric acid. A mixture including both coagulated products in the form of powder was prepared as a polymer mixture (X6).

Production Example 3-7

A latex of the glycidyl group-containing polymer (B-1) and a latex of the core-shell copolymer (C-1) were weighed in a weight ratio as shown in Table 3, to prepare a mixture in the state of latexes. The latexes were subjected to spray drying by using a spray dryer (manufactured by OHKAWARA KAKOHKI CO., LTD, L-8 type) under conditions of inlet temperature of 130° C. and outlet temperature of 60° C., an atomizer rotation speed of 16000 rpm, to prepare a polymer mixture (X7).

TABLE 3

Production Example of polymer mixture (resin-modifying particles) of glycidyl group-containing polymer (B) and core-shell copolymer (C)

| | | Production Example 3-1 X1 | Production Example 3-2 X2 | Production Example 3-3 X3 | Production Example 3-4 X4 |
|---|---|---|---|---|---|
| Glycidyl group-containing polymer (B1) | % by weight | 10 | 10 | 10 | 10 |
| Core-shell copolymer (C1) | % by weight | 90 | 90 | 90 | 90 |
| Blend method | | Latex blend | Latex blend | Latex blend | Latex blend |
| Coagulation method | | Hydrochloric acid coagulation | Phosphoric acid coagulation | Acetic acid coagulation | Sulfuric acid coagulation |

| | | Production Example 3-5 X5 | Production Example 3-6 X6 | Production Example 3-7 X7 |
|---|---|---|---|---|
| Glycidyl group-containing polymer (B1) | % by weight | 10 | 10 | 10 |
| Core-shell copolymer (C1) | % by weight | 90 | 90 | 90 |
| Blend method | | Latex blend | Powder blend | Latex blend |
| Coagulation method | | Calcium chloride coagulation | (B1) calcium chloride coagulation (C1) hydrochloric acid coagulation | Spray drying |

Evaluation of Vinyl Chloride Resin Composition (Example 1)

10 parts of the polymer mixture (resin-modifying particles) (X1) was added to 100 parts of vinyl chloride resin (A1) to prepare a vinyl chloride resin composition. The physical properties of the vinyl chloride resin composition were evaluated by the above items for evaluation. Results are shown in Table 4.

Example 2

A vinyl chloride resin composition was prepared as in the same manner as Example 1 except that a polymer mixture (X2) was added in place of the polymer mixture (resin-modifying particles) (X1). The similar evaluation was carried out for the obtained vinyl chloride resin composition. Results are shown in Table 4.

Example 3

A vinyl chloride resin composition was prepared as in the same manner as Example 1 except that a polymer mixture (X3) was added in place of the polymer mixture (resin-modifying particles) (X1). The above evaluation was carried out for the obtained vinyl chloride resin composition. Results are shown in Table 4.

Example 4

A vinyl chloride resin composition was prepared as in the same manner as Example 1 except that a polymer mixture (X4) was added in place of the polymer mixture (resin-modifying particles) (X1). The above evaluation was carried out for the obtained vinyl chloride resin composition. Results are shown in Table 4.

Example 5

A vinyl chloride resin composition was prepared as in the same manner as Example 1 except that a polymer mixture (X5) was added in place of the polymer mixture (resin-modifying particles) (X1). The above evaluation was carried out for the obtained vinyl chloride resin composition. Results are shown in Table 4.

Comparative Example 1

A vinyl chloride resin composition was prepared as in the same manner as Example 1 except that a polymer mixture (X6) was added in place of the polymer mixture (resin-modifying particles) (X1). The above evaluation was carried out for the obtained vinyl chloride resin composition. Results are shown in Table 4.

Comparative Example 2

A vinyl chloride resin composition was prepared as in the same manner as Example 1 except that a polymer mixture (X7) was added in place of the polymer mixture (resin-modifying particles) (X1). The above evaluation was carried out for the obtained vinyl chloride resin composition. Results are shown in Table 4.

TABLE 4

| | | | | Example 1 | Example 2 | Example 3 | Example 4 |
|---|---|---|---|---|---|---|---|
| Compounded Ratio | Vinyl chloride resin (A1) | | parts by weight | 100 | 100 | 100 | 100 |
| | Polymer mixture (resin-modifying particles) (X) | X1 | parts by weight | 10 | | | |
| | | X2 | parts by weight | | 10 | | |
| | | X3 | parts by weight | | | 10 | |
| | | X4 | parts by weight | | | | 10 |
| | | X5 | parts by weight | | | | |
| | | X6 | parts by weight | | | | |
| | | X7 | parts by weight | | | | |
| Composition of resin composition | Vinyl chloride resin (A1) | | parts by weight | 100 | 100 | 100 | 100 |
| | Resin-modifying particles | Glycidyl group-containing polymer (B) | parts by weight | 1 | 1 | 1 | 1 |
| | | Core-shell copolymer (C) | parts by weight | 9 | 9 | 9 | 9 |
| | Production method | Mixing method of (B) and (C) | | Latex blend | Latex blend | Latex blend | Latex blend |
| | | Powderization method or coagulation method | | Hydrocloric acid coagulation | Phosphoric acid coagulation | Acetic acid coagulation | Sulfuric acid coagulation |
| | Physical property | Blackening time (min) | | 120 | 120 | 120 | 120 |
| | | Un-gelled parts (number) | | 272 | 264 | 267 | 283 |
| | | Impact resistance ($kJ/m^2$) | 23° C. | 102.9 | 107.0 | 106.8 | 106.5 |
| | | | 0° C. | 17.3 | 18.9 | 19.0 | 19.1 |

| | | | | Example 5 | Comparative Example 1 | Comparative Example 2 |
|---|---|---|---|---|---|---|
| Compounded Ratio | Vinyl chloride resin (A1) | | parts by weight | 100 | 100 | 100 |
| | Polymer mixture (resin-modifying particles) (X) | X1 | parts by weight | | | |
| | | X2 | parts by weight | | | |
| | | X3 | parts by weight | | | |
| | | X4 | parts by weight | | | |
| | | X5 | parts by weight | 10 | | |
| | | X6 | parts by weight | | 10 | |
| | | X7 | parts by weight | | | 10 |

TABLE 4-continued

| Composition of resin composition | Vinyl chloride resin (A1) | | parts by weight | 100 | 100 | 100 |
|---|---|---|---|---|---|---|
| | Resin-modifying particles | Glycidyl group-containing polymer (B) | parts by weight | 1 | 1 | 1 |
| | | Core-shell copolymer (C) | parts by weight | 9 | 9 | 9 |
| Production method | | Mixing method of (B) and (C) | | Latex blend | Powder blend | Latex blend |
| | | Powderization method or coagulation method | | Calcium chloride coagulation | (B) calcium chloride coagulation (C) hydrochloric acid coagulation | Spray drying |
| Physical property | | Blackening time (min) | | 110 | 110 | 50 |
| | | Un-gelled parts (number) | | 520 | 702 | Infinite number |
| | | Impact resistance (kJ/m$^2$) | 23° C. | 90.8 | 100.1 | 12.3 |
| | | | 0° C. | 9.7 | 17.4 | 5.6 |

From results of Table 4, Examples 1 to 5 show that the impact resistance and the heat stability are sufficiently satisfied, and un-gelled parts (granulated projections) of the surface of the resin due to insufficient dispersibility of the glycidyl group—containing polymer (B) are decreased. In addition, Examples 1 to 4 indicate that un-gelled parts on the surface of the resin are decreased by acid coagulation. Therefore, in the case where a latex of the glycidyl group-containing polymer (B) and a latex of the core-shell copolymer (C) are mixed, and a mixture of the glycidyl group-containing polymer (B) and the core-shell copolymer (C) is coagulated by acid coagulation or salt coagulation to prepare a polymer mixture (resin-modifying particles), the impact resistance and the heat stability are sufficiently satisfied, and un-gelled parts on the surface of the resin are deceased.

Evaluation of Chlorinated Polyvinyl Chloride Resin Composition (Example 6)

To 100 parts of a chlorinated polyvinyl chloride resin (A2) (manufactured by KANEKA CORPORATION, product name: Kanevinyl (registered trademark) H-829, average polymerization degree of 900), 2.0 part of methyl tin mercapto stabilizer (manufactured by DAW Chemical Co., Ltd, product name: ADVANSTAB TM181), 1.0 part of processing aid (manufactured by DAW Chemical Co., Ltd, product name: PARALOIDK175), 3_6 parts of a stabilizer (manufactured by MIZUSAWA INDUSTRIAL CHEMICALS, LTD, STABINEX DSM-1), 0.3 parts of antioxidant (manufactured by BASF, product name: Irganox 175), 3.0 parts of titanium oxide (manufactured by Dupont, product name: Ti-pure R-902+), 6 parts of a powdered polymer mixture (resin-modifying particles) (X1) of the glycidyl group-containing polymer (B) and the core-shell copolymer (C) were mixed in the form of powder. A resultant mixture was kneaded using 8 inch test roll (manufactured by KANSAI ROLL Co., Ltd., test roll) under conditions of a rotation speed of 18 rpm, a temperature of 190° C., and kneading time of five minutes, and a kneaded product was pressed and molded with a press machine at 200° C. for 15 minutes, to prepare a pressed plate having a thickness of 1.0 mm. The impact resistance at 23° C. and the heat stability were measured using the test piece as described in the above conditions. Results are shown in Table 5.

Comparative Example 3

A vinyl chloride resin composition was prepared as in the same manner as Example 6 except that a core-shell copolymer (C-1) coagulated by hydrochloric acid was added in place of the polymer mixture (resin-modifying particles) (X1). The similar evaluation was carried out for the obtained vinyl chloride resin composition. Results are shown in Table 5.

TABLE 5

| | | | | Example 6 | Comparative Example 3 |
|---|---|---|---|---|---|
| Compounded Ratio | Chlorinated vinyl chloride resin (A2) | | parts by weight | 100 | 100 |
| | Polymer mixture (resin-modifying particles) (X) | X1 | parts by weight | 6 | |
| Composition of resin composition | Chlorinated vinyl chloride resin (A2) | | parts by weight | 100 | 100 |
| | Resin-modifying particles | Glycidyl group-containing polymer (B) | parts by weight | 0.6 | 0 |
| | | Core-shell copolymer (C) | parts by weight | 5.4 | 6 |
| Production method | | Mixing method of (B) and (C) | | Latex blend | — |
| | | Powderization method of coagulation method | | Hydrochloric acid coagulation | (C) Hydrochloric acid coagulation |
| Physical property | | Blackening time (min) | | 50 | 40 |
| | | Impact resistance (kJ/m$^2$) | 23° C. | 7.7 | 12.8 |

From results of Table 5, Example 6 sufficiently satisfies the impact resistance and the heat stability of the chlorinated vinyl chloride resin.

Therefore, according to the present invention, the impact resistance and the heat stability are sufficiently satisfied, while granulated projections generated on the surface of the resin by the addition of the conventional thermal stabilizer of epoxy polymer and by the insufficient dispersibility of the stabilizer are greatly decreased.

The invention claimed is:

1. Resin-modifying particles, each particle comprising:
a glycidyl group-containing polymer (B); and
a core-shell copolymer (C),
wherein the glycidyl group-containing polymer (B) and the core-shell copolymer (C) are included in each of the resin-modifying particles at a composite state, and
the glycidyl group-containing polymer (B) comprises a polymer obtained by polymerizing 50 to 100% by weight of a glycidyl group-containing ethylenically unsaturated monomer (B1) and 0 to 50% by weight of an unsaturated monomer (B2) different from the glycidyl group-containing ethylenically unsaturated monomer (B1).

2. The resin-modifying particles according to claim 1, wherein the polymer in the glycidyl group-containing polymer (B) is obtained by polymerizing 60 to 100% by weight of the glycidyl group-containing ethylenically unsaturated monomer (B1) and 0 to 40% by weight of the unsaturated monomer (B2) different from the glycidyl group-containing ethylenically unsaturated monomer (B1).

3. The resin-modifying particles according to claim 1, wherein the core-shell copolymer (C) comprises a core layer having an elastic rubber and a shell layer having a vinyl polymer covering the core layer.

4. The resin-modifying particles according to claim 1, wherein the glycidyl group-containing polymer (B) is contained in an amount of 1 to 30 parts by weight per 100 parts by weight of the sum of the glycidyl group-containing polymer (B) and the core-shell copolymer (C).

5. The resin-modifying particles according to claim 1, wherein a total amount of Mg and Ca is 100 ppm or less.

6. A vinyl chloride resin composition, comprising:
a vinyl chloride resin (A); and
resin-modifying particles, each particle comprising a glycidyl group-containing polymer (B) and a core-shell copolymer (C), where the glycidyl group-containing polymer (B) and the core-shell copolymer (C) are included in each of the resin-modifying particles at a composite state.

7. The vinyl chloride resin composition according to claim 6, wherein the resin-modifying particles are contained in an amount of 1 to 30 parts by weight per 100 parts by weight of the vinyl chloride resin (A).

8. The vinyl chloride resin composition according to claim 6, further comprising:
0.1 to 3.0 parts by weight of a tin stabilizer.

9. A method for preparing resin-modifying particles, comprising:
mixing a latex of a glycidyl group-containing polymer (B) with a latex of a core-shell copolymer (C); and
coagulating a mixture of the glycidyl group-containing polymer (B) and the core-shell copolymer (C) by either acid coagulation or salt coagulation,
wherein the glycidyl group-containing polymer (B) comprises a polymer obtained by polymerizing 50 to 100% by weight of a glycidyl group-containing ethylenically unsaturated monomer (B1) and 0 to 50% by weight of an unsaturated monomer (B2) different from the glycidyl group-containing ethylenically unsaturated monomer (B1).

10. The method according to claim 9, wherein the mixture of the glycidyl group-containing polymer (B) and the core-shell copolymer (C) are coagulated by acid coagulation.

11. The method according to claim 9, wherein 0.1 to 10 parts by weight of the glycidyl group-containing polymer (B) is mixed with 0.1 to 20 parts by weight of the core-shell copolymer (C).

12. A molded product obtained by molding the vinyl chloride resin composition of claim 6, wherein the number of granulated projections having a size of from 10 μm to 1000 μm on the surface of the molded product is 600 or less per 20 cm 20 cm.

13. The resin-modifying particles according to claim 1, wherein the unsaturated monomer (B2) comprises a (meth)acrylate containing an alkyl group and an unsaturated monomer containing an aromatic group.

14. The resin-modifying particles according to claim 1, wherein the glycidyl group-containing polymer (B) has a weight average molecular weight (Mw) of 10,000 to 500,000.

15. The resin-modifying particles according to claim 3, wherein the core layer contains a polymer obtained by polymerizing 50 to 100% by weight of a (meth)acrylate monomer (C1-3) and 0 to 50% by weight of a monomer (C1-4) copolymerizable with the (meth)acrylate monomer.

16. The resin-modifying particles according to claim 3, wherein the shell layer is a copolymer obtained by polymerizing 50 to 100% by weight of a vinyl monomer (C2-1) selected from the group consisting of methacrylic acid ester and acrylic acid ester, and 0 to 50% by weight of a monomer (C2-2) copolymerizable with the vinyl monomer (C2-1).

17. The resin-modifying particles according to claim 1, wherein each of the resin-modifying particles has a volume average particle diameter of 0.001 to 10 μm.

18. The method according to claim 9, wherein an acid coagulating agent for the acid coagulation comprises hydrochloric acid, sulfuric acid, phosphoric acid, and acetic acid.

19. The molded product according to claim 12, having an izod impact value of 85 kJ/m$^2$ or more at 23° C. when measured according to JIS K 7110.

20. A method for preparing a vinyl chloride resin composition, comprising:
mixing a latex of a glycidyl group-containing polymer (B) with a latex of a core-shell copolymer (C); and
coagulating a mixture of the glycidyl group-containing polymer (B) and the core-shell copolymer (C) by either acid coagulation or salt coagulation such that resin-modifying particles are prepared, where each particle of the resin-modifying particles comprises a glycidyl group-containing polymer (B) and a core-shell copolymer (C) at a composite state; and
mixing the resin-modifying particles with a vinyl chloride resin (A).

* * * * *